US011988022B1

(12) United States Patent
McGregor et al.

(10) Patent No.: US 11,988,022 B1
(45) Date of Patent: May 21, 2024

(54) TAMPER EVIDENT COMPUTER HOUSING LOCK

(71) Applicant: The Government of the United States as represented by the Director, National Security Agency, Ft. George G. Meade, MD (US)

(72) Inventors: Andrew R. McGregor, Glen Burnie, MD (US); Gary S. Mosholder, Sykesville, MD (US)

(73) Assignee: The Government of the United States as represented by the Director, National Security Agency, Ft. George G. Meade, MD (US)

( * ) Notice: Subject to any disclaimer, the term of this patent is extended or adjusted under 35 U.S.C. 154(b) by 61 days.

(21) Appl. No.: 17/476,593

(22) Filed: Sep. 16, 2021

(51) Int. Cl.
*E05B 65/00* (2006.01)
*E05B 73/00* (2006.01)

(52) U.S. Cl.
CPC ........ *E05B 65/006* (2013.01); *E05B 73/0082* (2013.01)

(58) Field of Classification Search
CPC .. E05B 73/00; E05B 73/0005; E05B 73/0082; E05B 65/006; E05B 65/0067; E05B 39/02
See application file for complete search history.

(56) References Cited

U.S. PATENT DOCUMENTS 3,171,182 A * 3/1965 Danehy .................... F16B 21/02 411/552
5,184,798 A * 2/1993 Wilson ............... G08B 13/1463 D8/356
6,227,017 B1 * 5/2001 Igelmund ............ E05B 73/0005 70/58

(Continued)

OTHER PUBLICATIONS

"Targus DEFCON T-Lock Serialized Combo Cable Lock, Model No. PA410S-1"; Web page <https://us.targus.com/products/defcon-t-lock-serialized-combo-cable-lock-pa410s1> retrieved on Sep. 24, 2021.

(Continued)

*Primary Examiner* — Christine M Mills
*Assistant Examiner* — Christopher F Callahan

(57) ABSTRACT

The housing lock includes a barrel, a screw and a bumper. The screw and bumper are threadedly engaged with one another and slidably engaged with the barrel. A barrel passageway includes a screw stop limiting sliding of the screw and bumper assembly in the distal direction and a bumper stop limiting sliding of the screw and bumper assembly in the proximal direction. The barrel includes feet. The perimeter defined by the feet is selected to closely fit within a housing passage in order to limit rotational movement of the housing lock within the housing passageway. The length of the feet is selected to prevent manipulation of the lockout of the housing passageway once the lock is secured to the housing. The barrel provides an exterior housing stop limiting movement of the housing lock relative (Continued)

to the housing in a distal direction. The bumper provides an interior housing stop limiting movement of the housing lock relative to the housing in a proximal direction. When secured to housing, the housing lock prevents removal of the housing cover from the housing chassis.

12 Claims, 10 Drawing Sheets

(56) References Cited

U.S. PATENT DOCUMENTS 7,100,403 B2 * 9/2006 Murray, Jr. ......... E05B 73/0082 70/58
2008/0315596 A1 * 12/2008 Terry .................... G09F 3/0317 709/250

OTHER PUBLICATIONS

"Kensington MicroSaver Keyed Notebook Lock K64598", Web page <https://www.kensington.com/p/products/technology-device-secuity-products/device-security-keyed-locks/speciality-locks/microsaver-keyed-laptop-lock/> retrieved on Sep. 24, 2021.
"User Manual for Kensington MicroSaver Keyed Notebook Lock K64598", Web page <https://az31609.vo.msecnd.net/literature/1337.pdf> retrieved from Web page <https://www.kensington.com/p/products/technology-device-secuity-products/device-security-keyed-locks/speciality-locks/microsaver-keyed-laptop-lock/> on Sep. 24, 2021.
"Kensington ClickSafe Custom Keyed Laptop Lock-Master BH No. KEK64639, MFR No. K64639", Web page <https://www.kensington.com/p/products/technology-device-security-products/device-security-keyed-locks/clicksafe-keyed-laptop-locks/> on Sep. 24, 2021.
"User Manual for Kensington ClickSafe Custom Keyed Laptop Lock-Master BH No. KEK64639, MFR No. K64639", Web page <https://az31609.vo.msecnd.net/literature/634.pdf> retrieved from Web page https://www.kensington.com/p/products/technology-device-security-products/device-security-keyed-locks/clicksafe-keyed-laptop-locks/> on Sep. 24, 2021.
"Kensington Combination Ultra Laptop Lock K64675", Web page <https://www.kensington.com/p/products/technology-device-security-products/device-security-combination-lock/combination-ultra-laptop-lock-2/> retrieved on Sep. 24, 2021.

* cited by examiner

TAMPER EVIDENT COMPUTER HOUSING LOCK

FIELD OF THE INVENTION

This invention is generally directed to a tamper evident computer housing lock.

BACKGROUND OF THE INVENTION

Unauthorized access to the components of certain hardware can create a security risk. It is important that such unauthorized access is detected in order to mitigate the damage which could be caused by the unauthorized access.

Certain hardware includes security slots designed to receive a lock used to prevent theft of the device. For example, many desktop computers include these security slots in the housing of the desktop. Specifically as illustrated in FIG. 1*a*, the desktop housing 10 includes a chassis 12 and a cover 14 each including a security slot 16, 18 extending through a sidewall. The security slot 16 of the chassis 12 extends from an interior surface 20*a* of the chassis sidewall 20 to an exterior surface 20*b* of the chassis sidewall 20. The security slot 18 of the cover 14 extends from an interior surface 22*a* of the cover sidewall 22 to an exterior surface 22*b* of the cover sidewall 22. When the chassis 12 and the cover 14 are assembled, the security slot 18 of the chassis 12 aligns with the security slot 16 of the cover 14 to create a housing passageway 30 as illustrated in FIG. 1*b* and FIG. 1*c*. The passageway 30 extends from the interior surface 20*a* of the chassis sidewall 20 to the exterior surface 22*b* of the cover sidewall 22.

SUMMARY OF THE INVENTION

Briefly, the present invention discloses a housing lock which uses a housing passageway to secure the chassis and cover of the housing together to prevent access to the interior of the housing. The lock includes a barrel, a screw, and a bumper. The barrel includes feet dimensioned to fit within the housing passageway and a barrel channel extending from a proximal end of the barrel to a distal end of the barrel along a central axis. The screw includes a head and a threaded portion. The bumper includes a foot and a threaded passageway. The screw and the bumper are threadedly engaged with each other via the threaded portion and the threaded passageway and are slidably engaged within the barrel channel. The bumper foot is dimensioned to pass through the housing passageway and when rotated relative to the housing passageway is prevented from passing back through the housing passageway. The threaded engagement between screw and the bumper allows for the lock to be securely attached to the housing.

BRIEF DESCRIPTION OF THE DRAWINGS

The organization and manner of the structure and operation of the invention, together with objects and advantages thereof, may best be understood by reference to the following description, taken in connection with the accompanying drawings, wherein like reference numerals identify like elements in which.

DETAILED DESCRIPTION OF THE PREFERRED EMBODIMENT

Figure 1A:
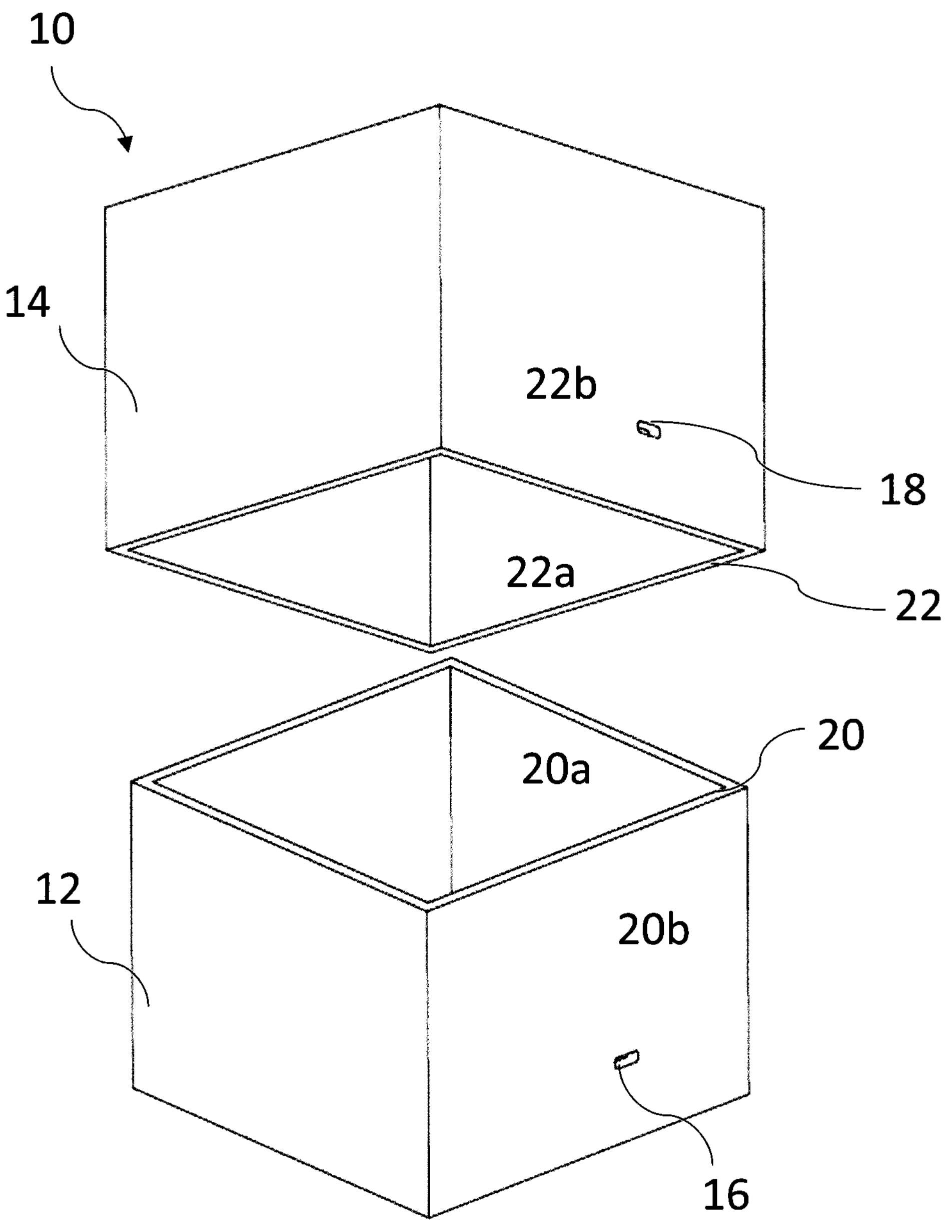
FIG1a (Prior Art)
FIG. 1*a* illustrates an exploded view of a prior art hardware housing.

While the invention may be susceptible to embodiment in different forms, there is shown in the drawings and herein will be described in detail, a specific embodiment with the understanding that the present disclosure is to be considered an exemplification of the principles of the invention, and is not intended to limit the invention to that as illustrated and described herein.

Figure 1B:
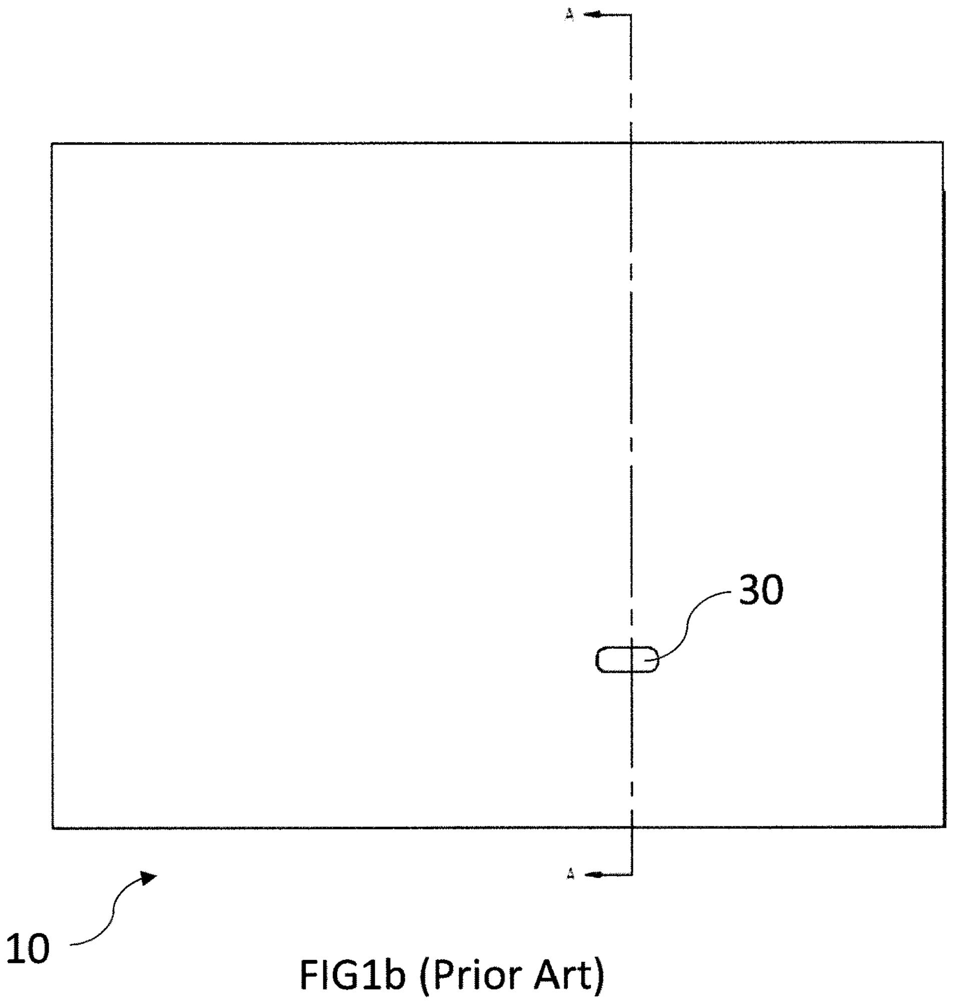
FIG1b (Prior Art)
FIG. 1*b* illustrates an elevated view of a housing provided by an assembled chassis and cover and a passageway provided by the assembled housing.
Figure 1C:
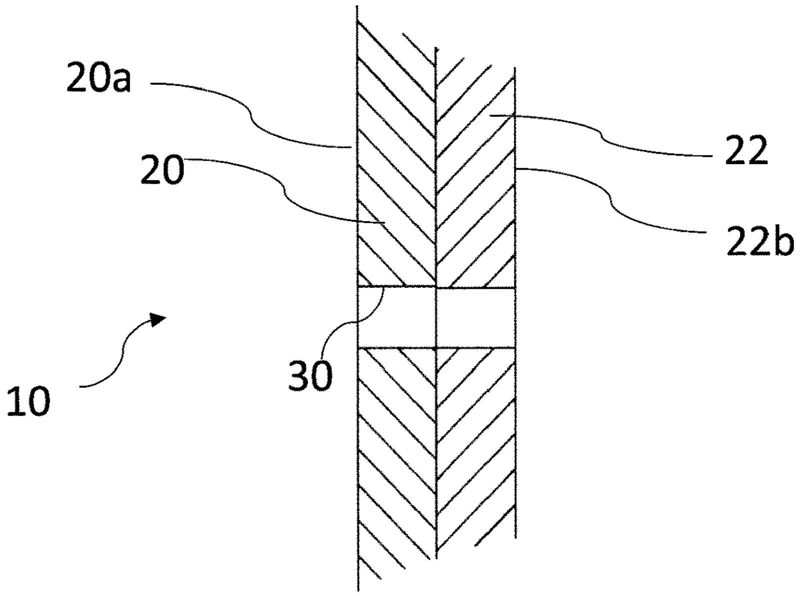
FIG1c (Prior Art)
FIG. 1*c* illustrates an enlarged cross-sectional view of the passageway provided by the prior art assembled housing illustrated in FIG. 1*b*.
Figure 2A:
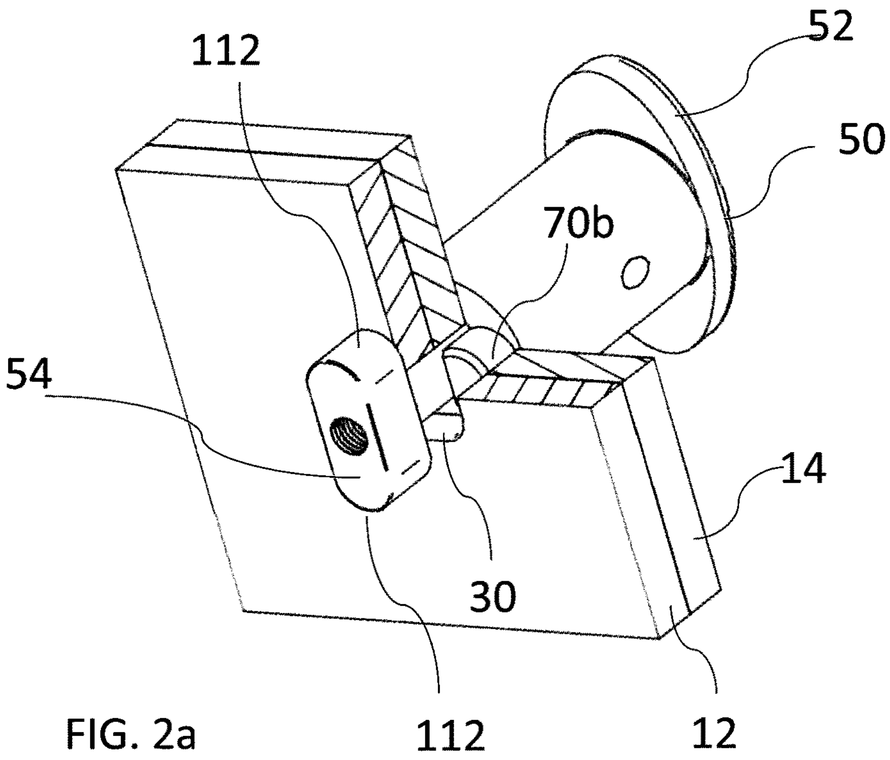
FIG. 2*a* illustrates a distal perspective view of the lock of the present invention mounted to a housing with a portion of the housing broken away.
Figure 2B:
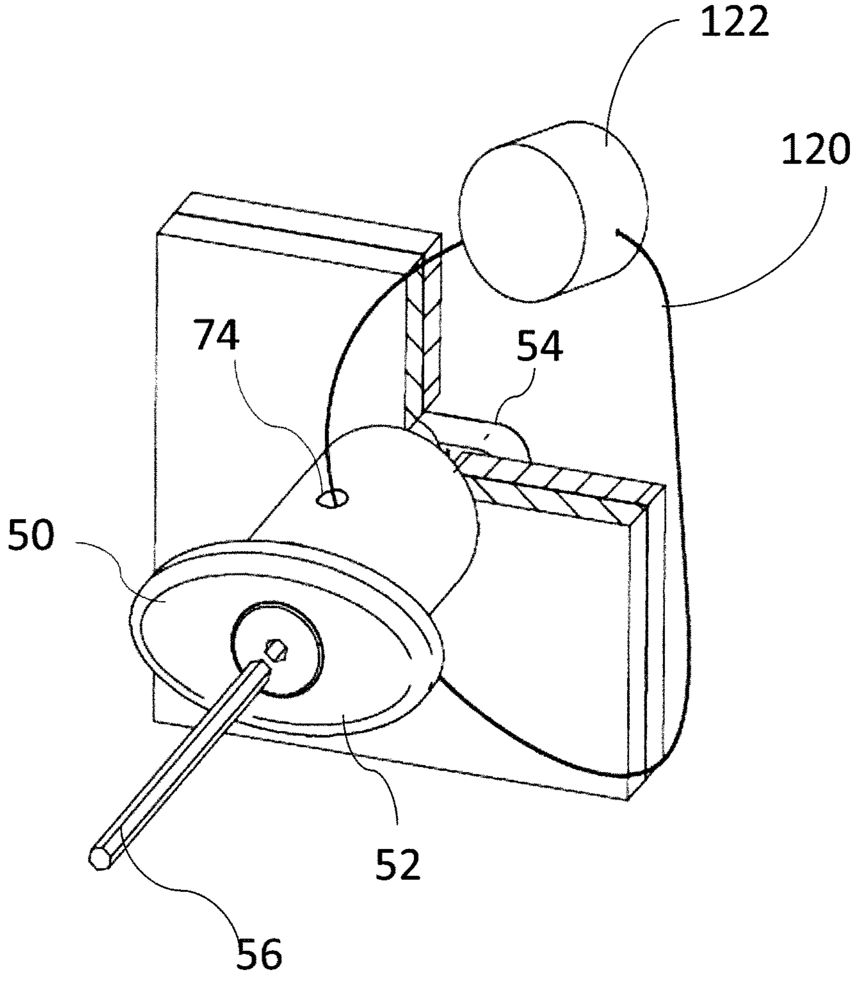
FIG. 2*b* illustrates a proximal perspective view of the lock of the present invention mounted to a housing with a portion of the housing broken away along with a wire loop seal mounted to the lock.

The invention provides a tamper evident lock 50 for securing hardware housing as illustrated in FIGS. 2*a* and 2*b*. The tamper evident lock 50 can be used in connection with any housing provided by two or more components that when secured together provide an aligned passageway, for example, the housing of FIG. 1 including the chassis 12 and the cover 14. As illustrated in FIGS. 2*a* and 2*b*, when secured to a housing, the lock 50 generally includes a proximal end 52 positioned outside of the housing and a distal end 54 positioned inside of the housing. As will be described below a user mounts the lock 50 to the housing from an exterior position. The terms "proximal" or "proximally" are used to reference elements closer to or in the direction of the user. The proximal end 52 of the lock 50 includes a recess for engaging a wrench 56 used to secure the lock 50 to the housing 10. The terms "distal" or "distally" are used to reference elements further away from the user. The distal end 54 of the lock 50 is positioned within the housing 10 and as will be described below includes a bumper that is inaccessible once the lock 50 is mounted and locked to the housing 10.

Figure 3:
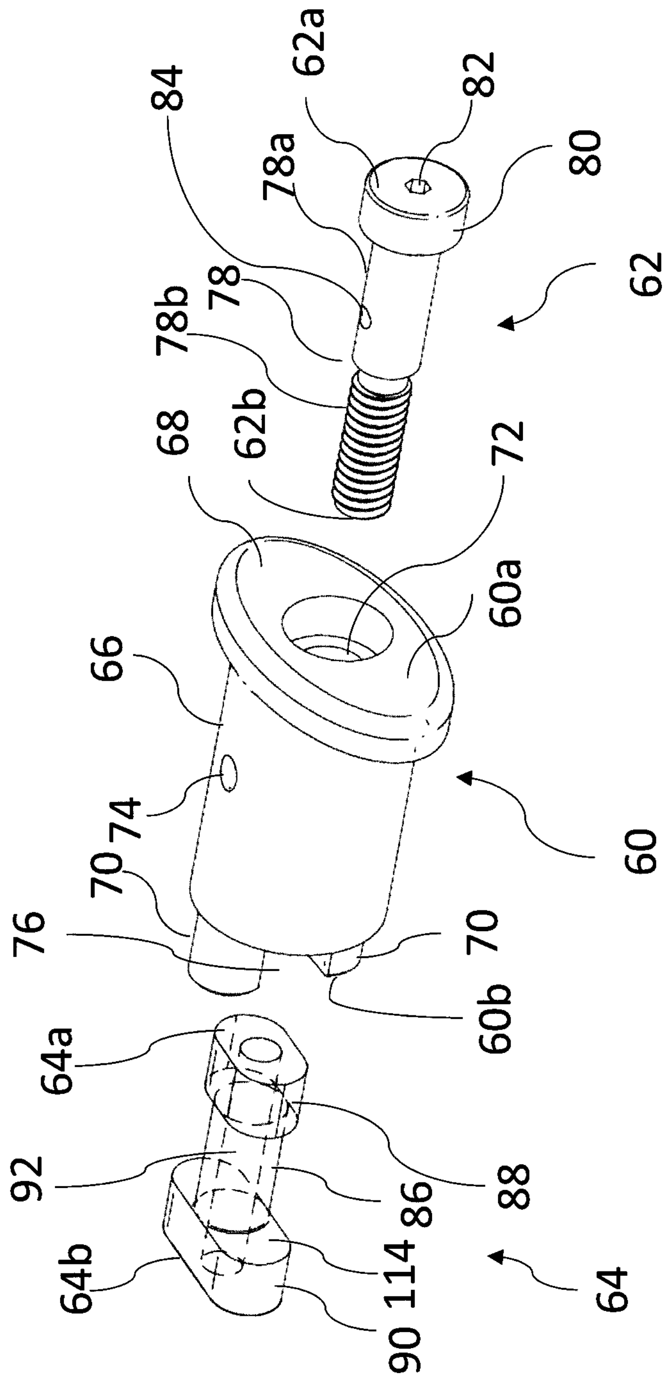
FIG. 3 illustrates an exploded perspective view of the lock of the present invention.

The tamper evident lock 50 is illustrated in FIG. 3 in exploded view. As illustrated in FIG. 3, the lock 50 generally includes a barrel 60, a screw 62 and a bumper 64.

The barrel 60 provides a proximal end 60*a* and a distal end 60*b*. The barrel 60 generally includes a shaft 66, a head 68, positioned at the proximal end 60*a* of the barrel, two feet 70 positioned at the distal end 60*b* of the barrel 60, a centrally positioned barrel channel 72 extending from the proximal end of the head 68 to the distal end of the shaft 66, and a wire loop passageway 74 that intersects with the barrel channel 72. A gap 76 is provided between the feet 70.

The screw 62 generally provides a proximal end 62*a* and a distal end 62*b*. The screw 62 generally includes a cylindrically-shaped shaft 78 and a head 80 at the proximal end 62*a* of the shaft 78. The proximal surface of the head 80 provides a screw drive 82 for receipt of a wrench as will be described below. The shaft generally provides a smooth portion 78*a* and threaded portion 78*b* located distally of the smooth portion 78*a*. At least one wire loop passageway 84 extends through the smooth portion 78*a* of the shaft 78.

The bumper 64 generally includes a proximal end 64*a* and a distal end 64*b*. The bumper 64 further includes a cylindrically-shaped shaft 86, an oblong-shaped head 88 at the proximal end 64*a* of the shaft 86, and an oblong-shaped foot 90 at the distal end 64*b* of the shaft 86. A cylindrically-shaped threaded bumper passageway 92 extends from the proximal end 64*a* to the distal end 64*b* of the bumper 64.

Additional details of the barrel 60 are illustrated in FIGS. 4*a*-4*d*. The shaft 66 is generally oblong and elongated and provides a proximal end 66*a* and distal end 66*b*. The barrel 60 defines a central axis 97 extending from the proximal end 60*a* to the distal end 60*b*. The barrel head 68 is provided at the proximal end 66*a* of the shaft 66 and the feet 70 extend from the distal end 66*b* of the shaft 66. An exterior housing stop 94 is provided by the distal end 66*b* of the barrel shaft 66. The shaft 66 optionally includes a generally planar barrel printing surface 96 to receive a printed serial number (see FIG. 4*e*). The head 68 is generally oblong and disc-shaped and is preferably sized for ease in gripping by the user. Each foot 70 is elongated with a generally semicircular cross section. Each foot 70 includes a flat inner surface 70*a*, spaced from one another to define the gap 76 (see FIG. 4*d*, a rounded exterior surface 70*b*, and a distal end surface 70*c*. The shape and dimensions of the feet 70 of the barrel 60 are selected to provide a perimeter which allows positioning of the feet 70 within the housing passageway 30 while maintaining a close fit within the housing passageway 30, thereby preventing rotation of the barrel 60 relative to the housing passageway 30. The length of the feet 70 is defined by the distance from the distal end 66*b* of the shaft 66 to the distal end surface 70*c*. The length of the feet 70 is selected to prevent manipulation of the distal end surfaces 70*c* of the feet 70 through the housing passageway 30, once the lock 50 has been secured to the housing 10 as will be described below.

Figure 4A:
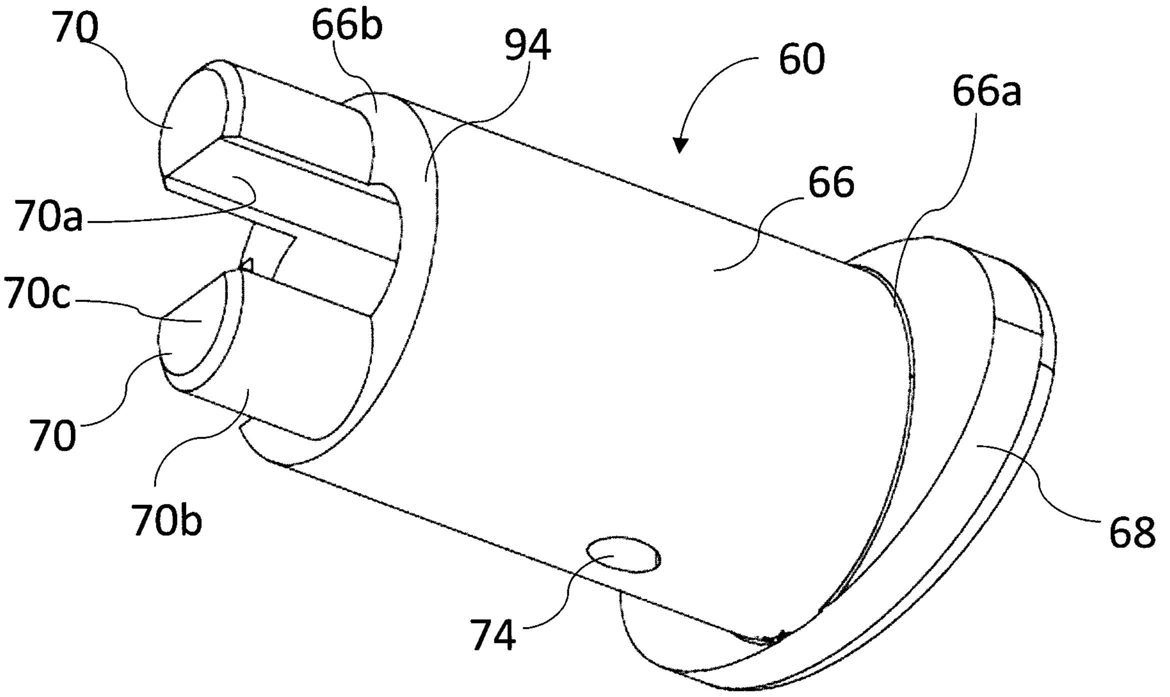
FIG. 4*a* illustrates a distal perspective view of the barrel of the present invention.
Figure 4B:
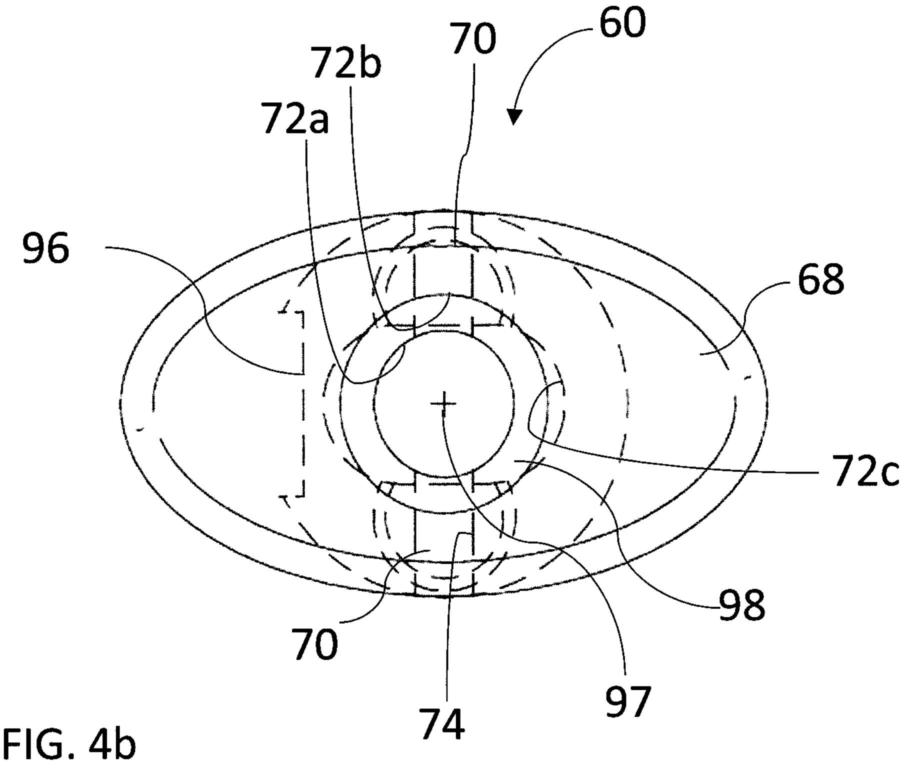
FIG. 4*b* illustrates an elevated proximal end view of the barrel of the present invention.
Figure 4C:
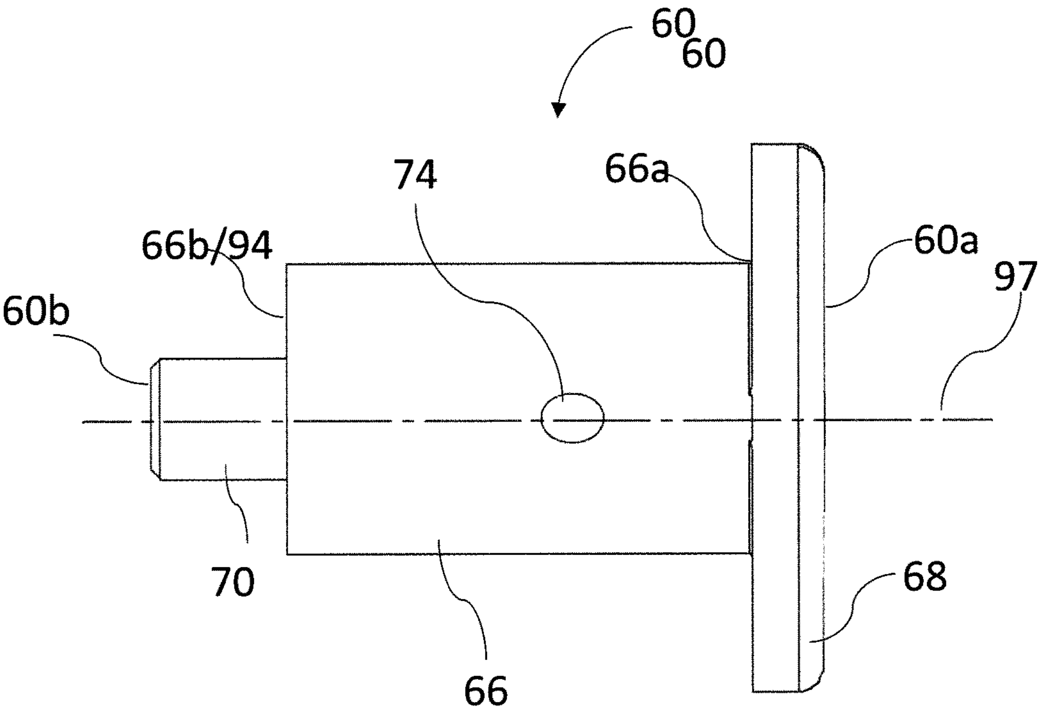
FIG. 4*c* illustrates an elevated side view of the barrel of the present invention.
Figure 4D:
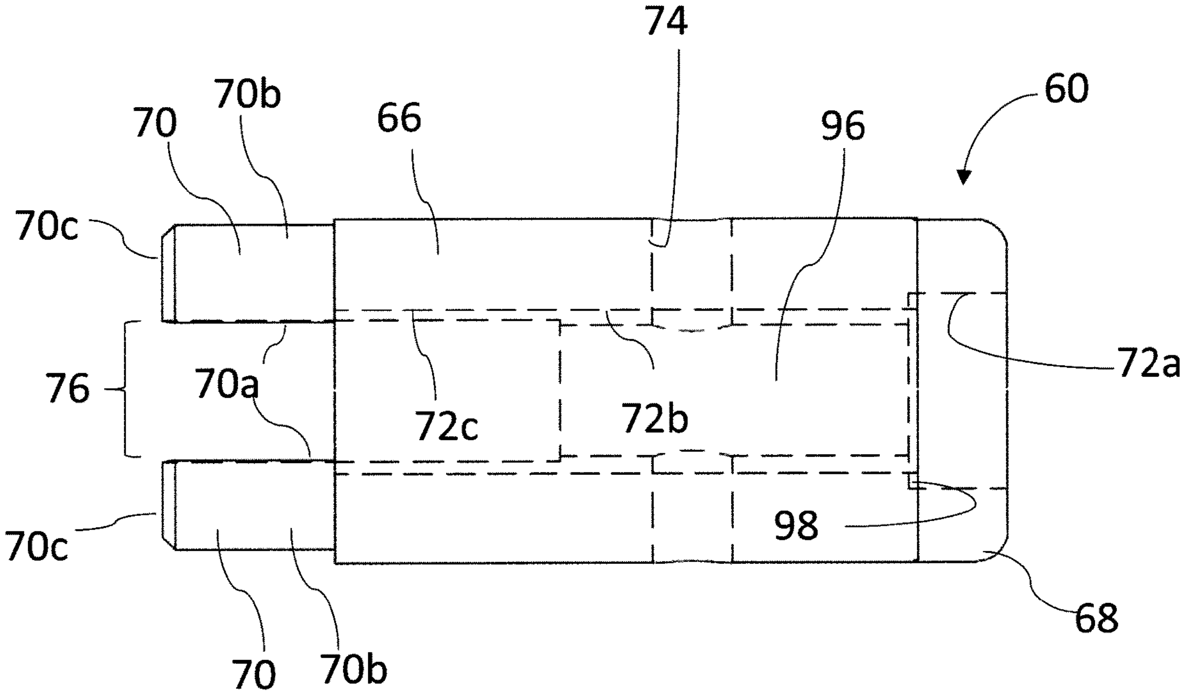
FIG. 4*d* illustrates an alternative elevated side view of the barrel of the present invention.
Figure 4E:
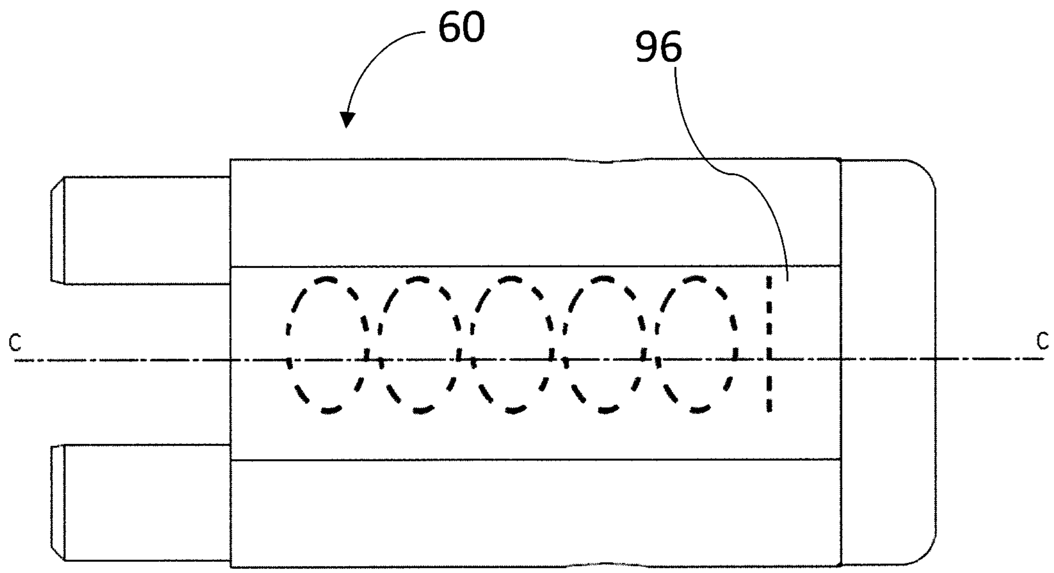
FIG. 4*e* illustrates an alternative elevated side view of the barrel of the present invention.
Figure 4F:
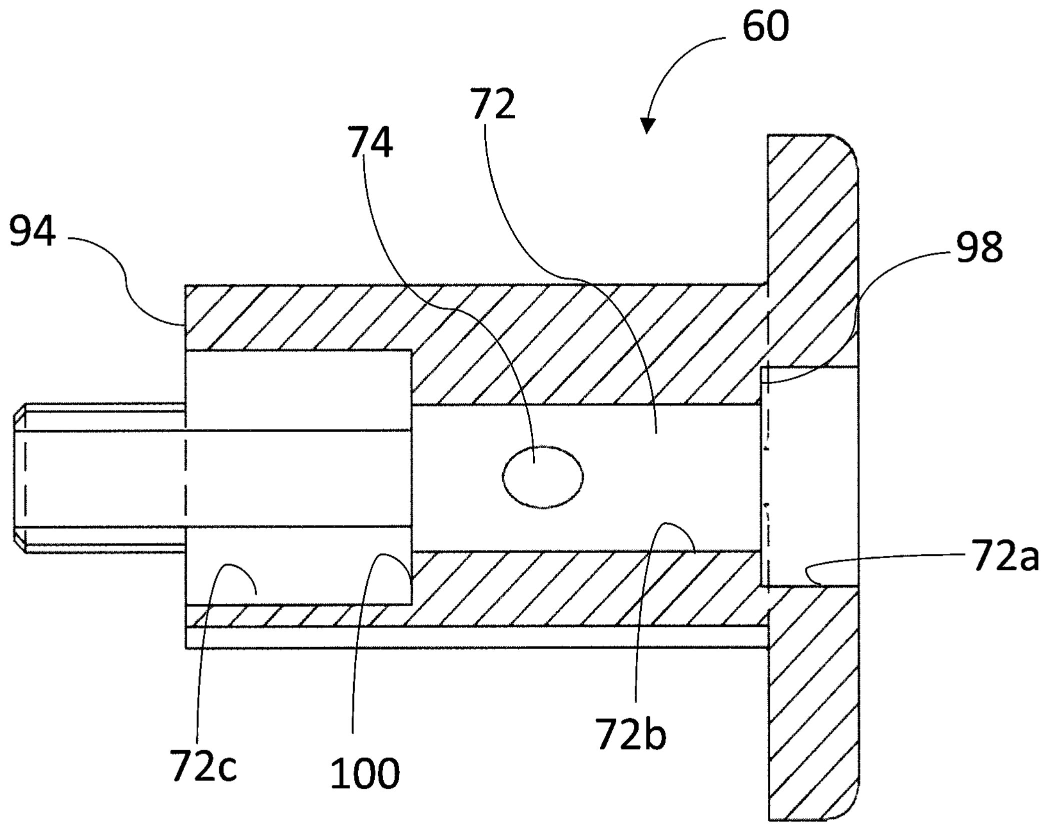
FIG. 4*f* illustrates a cross-section view of the barrel of the present invention taken along line c-c of FIG. 4*e;*

The barrel channel 72 includes a cylindrically-shaped head portion 72*a* having a circular cross-section, a cylindrically-shaped base portion 72*b* having a circular cross-section, and a bumper portion 72*c* having an oblong cross-section. The head, base, and bumper portions 72*a*, 72*b*, 72*c* of the barrel channel 72 are axially alighted along central axis 97. The diameter of the head portion 72*a* of the barrel channel 72 is dimensioned to receive the head 80 of the screw 62 and the base portion 72*b* is dimensioned to receive the shaft 78 of the screw 62. The transition between the head portion 72*a* of the barrel channel 72 and the base portion 72*b* of the barrel channel 72 forms a screw stop 98 (see FIGS. 4*b* and 4*f*) to limit movement of the screw 62 in the distal direction. The transition between the base portion 72*b* of the barrel channel 72 and the bumper portion 72*c* of the barrel channel 72 forms a bumper stop 100 (see FIG. 40. The bumper portion of the barrel channel 72*c* is in communication with the gap 76 between the feet 70. As best illustrated in FIG. 4*d*, the wire loop passageway 74 of the barrel 60 extends along an axis transverse to central axis 97 and intersects with the barrel channel 72.

Figure 5:
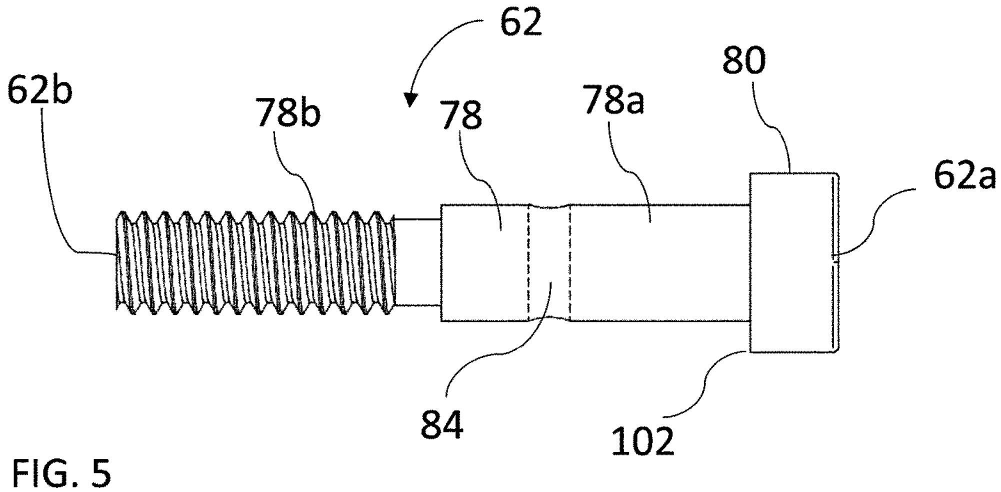
FIG. 5 illustrates an elevated side view of the screw of the present invention.

As illustrated in FIG. 5, the screw 62 generally includes the cylindrically-shaped shaft 78 having a smooth portion 78*a*, a threaded portion 78*b* and an enlarged head 80 at the proximal end 62*a* of the shaft 78. The proximal end 62*a* of the screw 62 is provided by the flat proximal surface of the screw head 80. The flat distal surface 102 of the screw head 80 engages the screw stop 98 of the barrel 60 as will be described below. The diameter of the smooth portion 78*a* of the shaft 78 is selected to provide sliding engagement between the smooth portion 78*a* and base portion 72*b* of the barrel channel 72. The dimensions of the head 80 are selected to allow the head 80 of the screw 62 to reside within the head portion 72*a* of the barrel channel 72. The dimensions of the threaded portion 78*b* of the screw are selected to provide threaded engagement between the screw 62 and the head of the bumper 64. The wire loop passageway 84 extends through the smooth portion 78*a* of the shaft 78 along an axis transverse to the central axis 97.

Figure 6A:
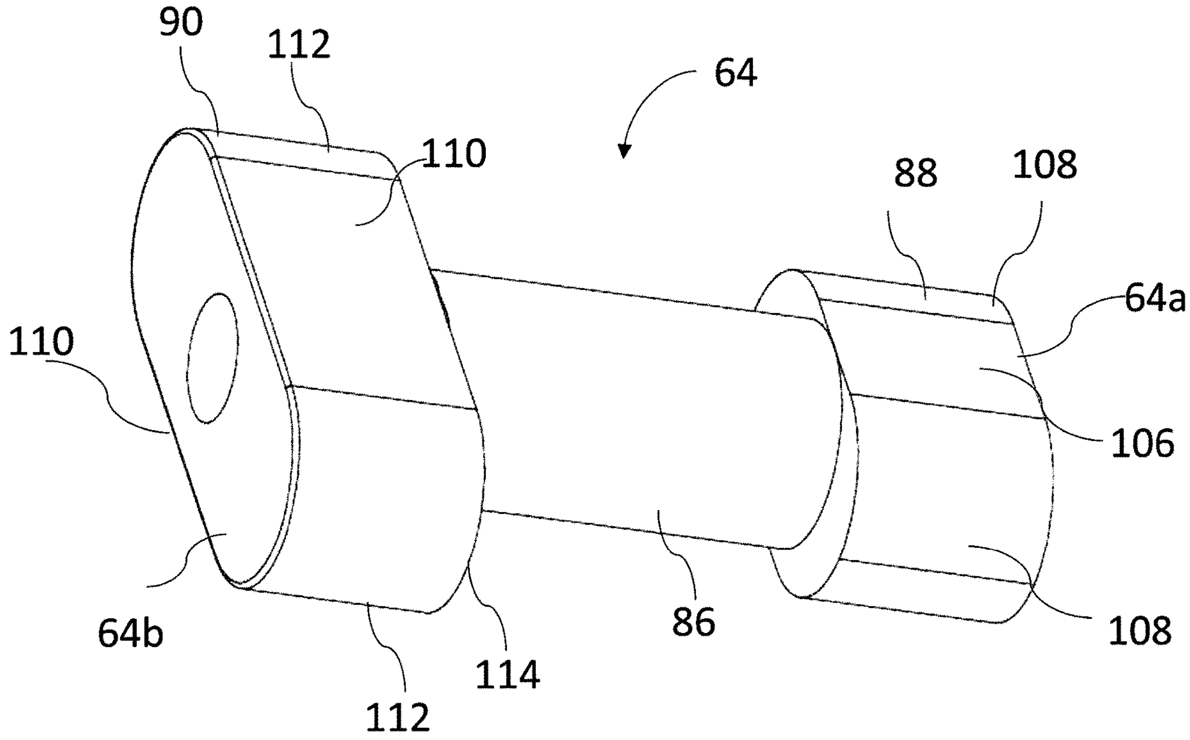
FIG. 6*a* illustrates a distal perspective view of the bumper of the present invention.
Figure 6B:
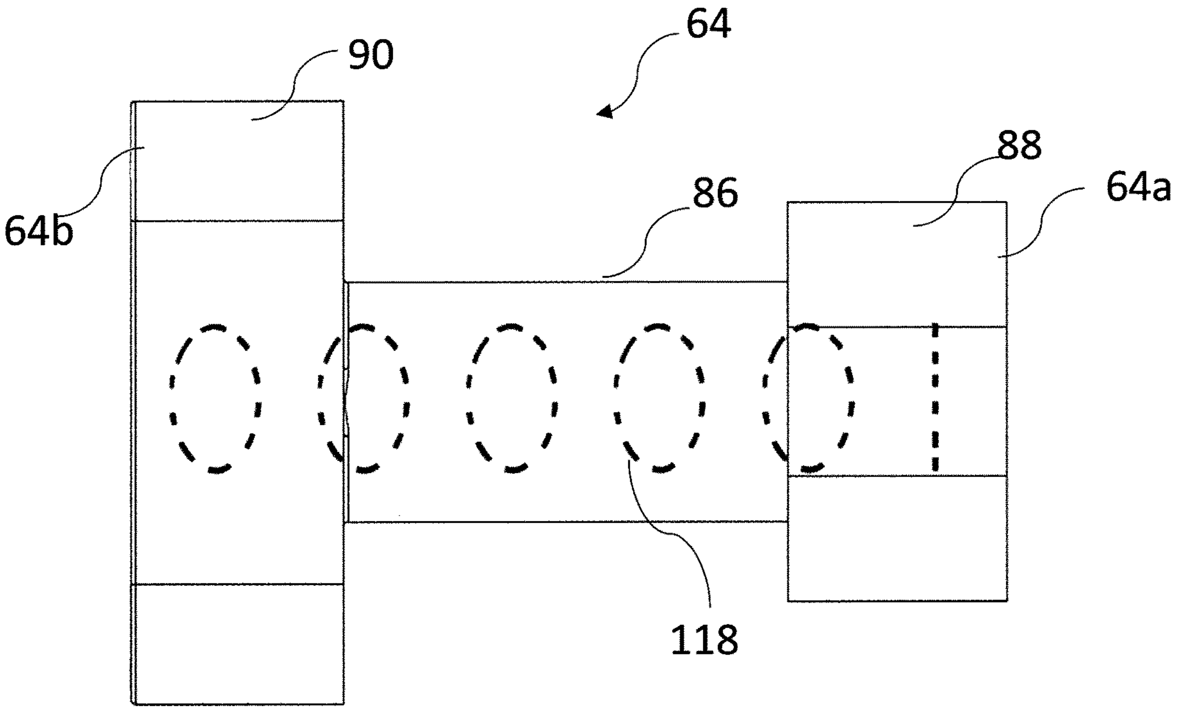
FIG. 6*b* illustrates an elevated side view of the bumper of the present invention.
Figure 6C:
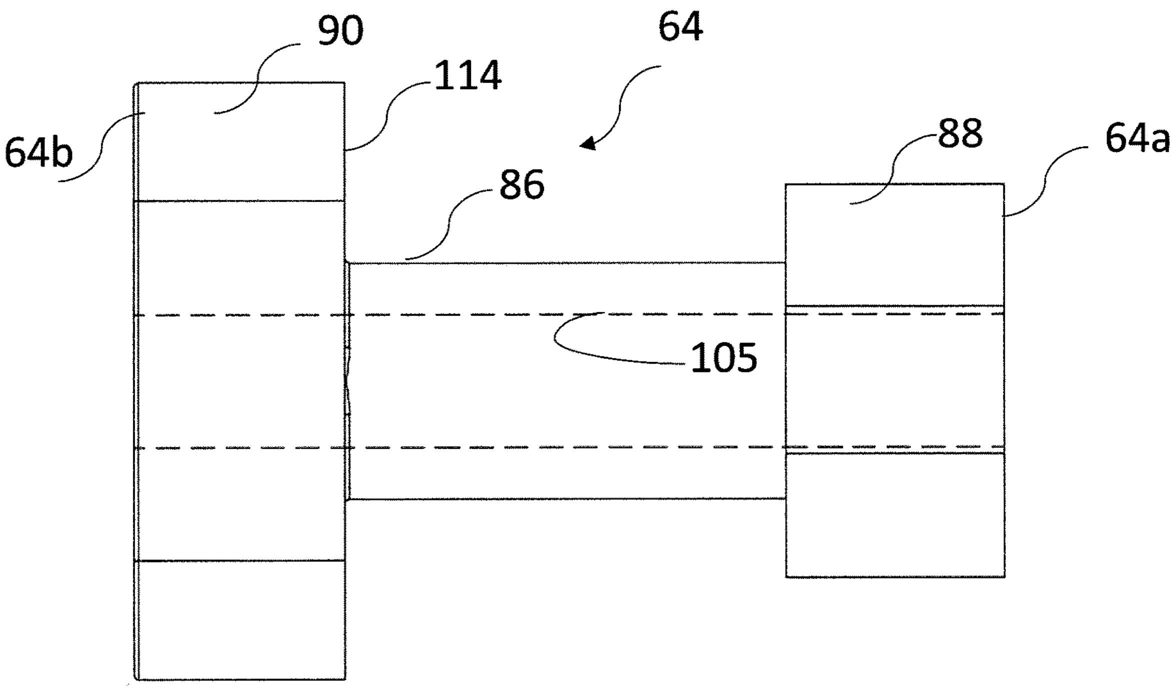
FIG. 6*c* illustrates an alternative elevated side view of the bumper of the present invention.

The bumper 64 is illustrated in FIGS. 6*a*-6*c* and provides a proximal end 64*a* and a distal end 64*b*. A cylindrically-shaped threaded passageway 105 extends from the proximal end 64*a* to the distal end 64*b* of the bumper 64. The head 88 of the bumper 64 is smaller than the foot 90 of the bumper 64. The perimeter of the oblong-shaped head 88 provides opposite flat outer surfaces 106 and opposite curved surfaces 108. The head 88 provides the flat proximal end 64*a* of the bumper 64. The shape and dimensions of the head 88 are selected to allow the head 88 of the bumper 64 to pass through the gap 76 between the feet 70 of the barrel 60 and to allow the head 88 of the bumper 64 to slide within the bumper portion 72*c* of the barrel channel 72.

The perimeter of the oblong-shaped foot 90 provides opposite flat outer surfaces 110 and opposite curved surfaces 112. The foot 90 provides the flat distal end surface 64*b* of the bumper 64. An interior housing stop 114 is provided by the flat proximal surface of the foot 90. The shape and dimensions of the foot 90 are selected to allow the foot 90 of the bumper 64 to pass through the housing passageway 30 when properly aligned with the housing passageway 30. The flat surfaces of the head and foot and the outer surface of the shaft optionally provide a bumper printing surface to receive a printed serial number 118 as illustrated in FIG. 6*b*.

Assembly of the lock 50 begins by passing the distal end 62*b* of the screw into the proximal end of the barrel channel 72. As the screw 62 is advanced within the barrel channel 72, the threaded portion 78*b* of the screw 62 is positioned between the feet 70 of the barrel 60 and the head 80 of the screw 62 is positioned within the head portion 72*a* of the barrel channel 72. Advancement of the screw 62 within the barrel channel 72 of the barrel 60 stops when the distal surface 102 of the screw head 80 abuts the screw stop 98 of the barrel 60.

Next, the flat surfaces 106 of the bumper head 88 are aligned between the flat inner surfaces 70*a* of the barrel feet 70. As the bumper head 88 is advanced into the gap 76 between the flat inner surfaces 70*a* of the feet 70, the rounded surfaces 108 of the bumper head 88 will be axially aligned with the bumper portion 72*c* of the barrel channel 72 and the threaded bumper passageway 105 will begin to receive the distal end of the screw 62. The screw 62 is rotated within the threaded bumper passageway 105 to threadedly engage the screw 62 and the bumper 64 until the bumper 64 is firmly attached to the distal end 62*b* of the screw 62. With the bumper 64 threadedly attached, the curved end surfaces 112 of the bumper foot 90 are 90 degrees out of alignment with curved surfaces 70*b* of the feet 70 of the barrel 60 relative to the central axis 97 (only one foot 70 is illustrated in FIG. 2*a*). Engagement between the inner surfaces 70*a* of the feet 70 and the flat surfaces 106 of the bumper head 88 and/or engagement between the bumper portion 72*c* of the barrel channel 72 and the flat surfaces 106 of the bumper head 88 prevents rotation of the bumper 64 relative to the barrel 60 thereby maintaining the 90 degree rotational offset between the bumper 64 and the barrel 60. With the bumper 64 attached to the screw 62, the bumper-screw assembly 62+64 is slidably engaged with the barrel channel 72. Movement of the bumper-screw assembly 62+64 in the distal direction is limited by the abutment of the distal surface of the screw head 80 with the screw stop 98 of the barrel 60. Movement of the bumper-screw assembly 62+64 in the proximal direction is limited by the abutment of the proximal surface of the bumper head 88 with the bumper stop 100 of the barrel 60.

Next, the assembled lock 50 is mounted to the housing by aligning the foot 90 of the bumper 64 with the housing passageway 30 and then passing the foot 90 of the bumper 64 through the housing passageway 30 until the foot 90 of the bumper 64 is positioned within the housing 10. Next, as illustrated in FIG. 2*b*, the assembled lock 50 is rotated relative to the housing so that the foot 90 of the bumper 62 is rotationally misaligned with the housing passageway 30 to prevent the foot 90 of the bumper 62 from passing back through the housing passageway 30.

Next, a wrench 56 (see FIG. 2*b*) is inserted into the screw drive 82 and is rotated to further rotate the screw 62 within the threaded bumper passageway 105. As the screw 62 is further rotated, engagement of the threaded portion 78*b* of the screw shaft 78 with the threaded bumper passageway 105 draws the bumper 64 in the proximal direction reducing the distance between the exterior housing stop 94 provided by the barrel shaft 66 and the interior housing stop 114 provided by the foot 90 of the bumper 64. Rotation of the screw continues until the interior housing stop 114 abuts the inner surface of the chassis and the exterior housing stop 94 abuts the exterior surface of the cover to achieve a secured attachment between the assembled lock and the housing, as illustrated in FIGS. 2*a* and 2*b*. In this secured attachment position, the feet 70 of the barrel 60 are positioned within the housing passageway 30 thereby preventing the lock 50 from rotating relative to the housing. In this secured attachment position, abutment between the feet 70 of the barrel 60 and the housing passageway 30, abutment between the interior housing stop 114 and the housing chassis, and abutment between the exterior housing stop 94 and the housing cover, prevents movement between the housing 10 and assembled lock 50.

With secured attachment achieved between the assembled lock 50 and the housing 10, the distal surface of the screw head 80 is in abutment with the screw stop 98 of the barrel 60 and the wire loop passageway 74 of the barrel 60 will be axially aligned, along the central axis 97, with the wire loop passageway 84 of the screw 62. Next, a visual inspection is made to determine if the wire loop passageway 84 of the screw 62 is in rotational alignment with the wire loop passageway 74 of the barrel 60. If rotational alignment is not provided, the screw 62 is rotated to achieve rotational alignment. Due to the small size and frequency of the threads, if additional rotation is required to achieve rotational alignment, the additional rotation needed to achieve rotational alignment will result in an insignificant loosening/tightening of the bumper 64 relative to the barrel 60. As a result, the bumper 64 and barrel 62 remain firmly engaged with the housing 10. When rotational alignment is achieved, the lock 50 will be in a locked position. In this locked position, the wire 120 of a wire loop seal 122 is inserted through the wire loop passageways 74, 84 as illustrated in FIG. 2*b*, to prevent rotation of the screw 62. The wire loop seal 122 is then secured. Removal of the wire loop seal 122 requires cutting of the wire 120 and therefore the wire loop seal provides tamper evidence. A serial number or other uniquely identify indicia, may be printed on the wire loop seal 122 to provide evidence of replacement of the wire loop seal 122 with a new wire loop seal 122. Similarly, serial numbers may be printed on the barrel 60 and bumper 64 of the lock 50 to provide evidence of the replacement of the barrel 60 and/or bumper 64 (See FIGS. 4*e* and 6*b*).

Figure 7:
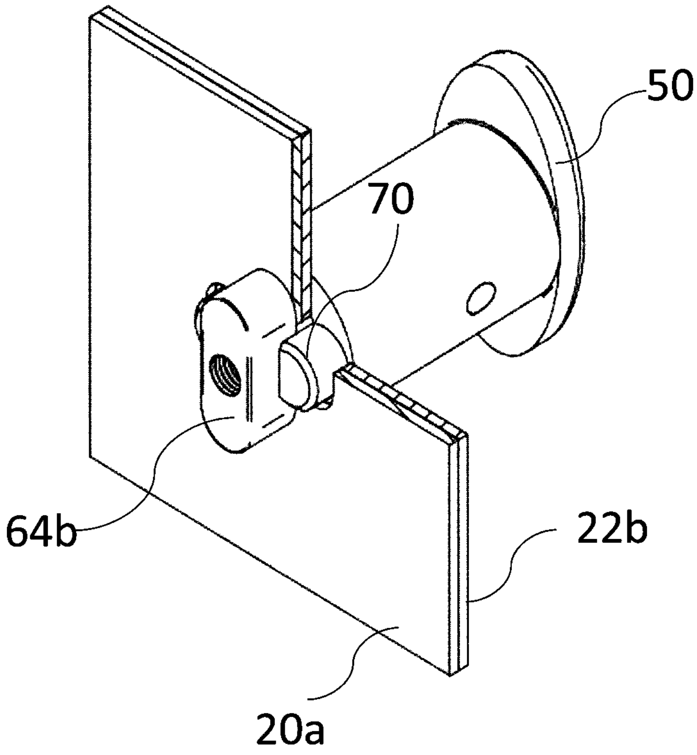
FIG. 7 illustrates a distal perspective view of the lock of the present invention mounted to a housing wherein a portion of the housing is broken away and wherein the thickness of the housing in FIG. 7*a* is smaller than the thickness of the housing illustrated in FIGS. 2*a* and 2*b*.

An advantage provided by the present invention is that the lock 50 accommodates housings 10 of a variety of thicknesses. FIG. 2*a* illustrates an assembled housing 10 wherein the thickness from the inner surface 20*a* of the chassis sidewall 20 to the outer surface 22*b* of the cover sidewall 22 is greater than the length of the feet 70 of the barrel 60, FIG. 7 illustrates an assembled housing 10 wherein the thickness from the inner surface 20*a* of the chassis sidewall 20 to the outer surface 22*b* of the cover sidewall 22 is smaller than the length of the feet 70 of the barrel 60. After the assembled lock 50 is mounted to the housing 10 as described above, the screw 62 is rotated within the threaded bumper passageway 105, the bumper 64 is drawn in the proximal direction reducing the distance between the exterior housing stop 94 and the interior housing stop 114. Because the thickness of the housing sidewalls is smaller than the length of the feet 70 of the barrel 60, as the screw 62 is rotated, the foot 90 of the bumper 64 is drawn into the gap 76 between the flat inner surfaces 70*a* of the feet 70 of the barrel 60 until a secured attachment of the assembled lock 50 to the housing 10 is achieved. After a secured attachment is achieved, a locked position of the assembled lock 50 is provided by ensuring rotational alignment between the wire loop passageway 84 of the screw 62 and the wire loop passageway 74 of the barrel 60 and a wire 120 of a wire loop seal 122 is inserted through the wire loop passageways 74, 84 to prevent rotation of the screw 62 as described above.

In addition to accommodating housings of different thickness, the lock 50 can be mounted to the housing with ease and efficiency. Once the screw 62 and bumper 64 are assembled with the barrel 60, engagement with the housing only requires passage of the barrel foot 90 though the housing passageway 30, rotation of the assembly relative to the housing 10, rotation of the screw 62 with a wrench, and insertion of the wire loop seal. Engagement between the screw stop 98 of the barrel channel 72 and the head 80 of the screw 62 prevents the screw from further advancement within the barrel channel 72, the wire loop passageway 84 of the screw 62 and the wire loop passageway 74 of the barrel 74 will maintain alignment in the axial direction. Thus, once the lock is secured to the housing, alignment of the loop passageways is only required in the rotational direction prior to insertion of the wire 120 of a wire loop seal 122.

Another advantage provided by the present invention is that when mounted to the housing 10 the barrel shaft 66 prevents access to the interior of the housing 10 via the housing passageway 30.

While embodiments of the present invention are shown and described, it is envisioned that those skilled in the art may devise various modifications of the present invention without departing from the spirit and scope of the appended claims. For example, although only one wire loop passageway 84 is illustrated in FIG. 3, multiple wire loop passageways 84 could be provided in order to more easily align the wire loop passageway of the screw 60 with the wire loop passageway 74 of the barrel shaft 60. Although the foot 90 of the bumper 64 is described as oblong-shaped, it is to be understood that the foot 90 of the bumper 64 may be of any shape to allow for passage through the housing passageway 30 as the lock 50 is mounted to the housing 10 and misalignment with the housing passageway 30 after mounting the lock 50 to the housing 10.

The invention claimed is:

1. A lock for securing a housing having a housing passageway, the lock comprising:

a barrel including a shaft defining a central axis, feet extending distally from the shaft and dimensioned to fit within the housing passageway, an exterior housing stop, and a barrel channel extending from a proximal end of the barrel shaft to a distal end of the barrel shaft;

a screw including a threaded portion, the screw positioned within the barrel channel;

a bumper including a foot and a threaded passageway;

wherein the threaded portion of the screw is engaged with the threaded passageway of the bumper and the bumper foot is dimensioned to pass through the housing passageway and provides an interior housing stop;

wherein the screw further includes a head and the barrel channel includes a screw stop, and wherein axial movement of the screw is limited by the screw stop; and wherein the screw further includes a wire passageway and the barrel further includes a wire passageway, and wherein abutment of the screw head with the screw stop provides axial alignment between the wire passageways.

2. The lock of claim 1, wherein the feet of the barrel are spaced to define a gap in communication with the barrel channel.

3. The lock of claim 2, wherein the bumper further includes a head and a distal portion of the barrel channel is dimensioned to receive the head of the bumper.

4. The lock of claim 3, wherein the distal portion of the barrel channel provides a bumper stop.

5. The lock of claim 2, wherein the gap receives at least a portion of the foot of the bumper, with the feet positioned within the housing passageway.

6. The lock of claim 1, further including a wire loop lock wherein the wire of the wire loop lock is inserted through the wire passageway of the screw and the wire passageway of the barrel.

7. The lock of claim 1, wherein the barrel includes a unique identifier.

8. The lock of claim 1, wherein the bumper includes a unique identifier.

9. A lock for securing a housing having a housing passageway, the lock comprising:

a barrel including a shaft defining a central axis, feet extending distally from the shaft and dimensioned to fit within the housing passageway and spaced to define a gap, an exterior housing stop, and a barrel channel extending from a proximal end of the barrel shaft to a distal end of the barrel shaft and in communication with the gap;

a screw including a threaded portion, the screw positioned within the barrel channel;

a bumper including a foot and a threaded passageway; and wherein the threaded portion of the screw is engaged with the threaded passageway of the bumper and the bumper foot is dimensioned to pass through the housing passageway and provides an interior housing stop;

wherein the screw further includes a head and the barrel channel includes a screw stop, and wherein axial movement of the screw is limited by the screw stop; and wherein the screw further includes a wire passageway and the barrel further includes a wire passageway, and wherein abutment of the screw head with the screw stop provides axial alignment between the wire passageways.

10. The lock of claim 9, wherein the bumper further includes a head and a distal portion of the barrel channel provides a bumper stop and is dimensioned to receive the head of the bumper.

11. The lock of claim 9, wherein the gap receives at least a portion of the foot of the bumper, with the feet positioned within the housing passageway.

12. The lock of claim 9, further including a wire loop lock wherein the wire of the wire loop lock is inserted through the wire passageway of the screw and the wire passageway of the barrel.

* * * * *